United States Patent
Wu et al.

(10) Patent No.: US 9,961,595 B2
(45) Date of Patent: May 1, 2018

(54) METHOD OF HANDLING COVERAGE ENHANCEMENT IN WIRELESS COMMUNICATION SYSTEM

(71) Applicant: HTC Corporation, Taoyuan County (TW)

(72) Inventors: Chih-Hsiang Wu, Taoyuan County (TW); Chih-Yao Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 475 days.

(21) Appl. No.: 14/529,173

(22) Filed: Oct. 31, 2014

(65) Prior Publication Data

US 2015/0117410 A1    Apr. 30, 2015

Related U.S. Application Data

(60) Provisional application No. 61/898,445, filed on Oct. 31, 2013.

(51) Int. Cl.
*H04W 4/00* (2018.01)
*H04W 36/00* (2009.01)
*H04L 1/08* (2006.01)

(52) U.S. Cl.
CPC ........... *H04W 36/0055* (2013.01); *H04L 1/08* (2013.01)

(58) Field of Classification Search
CPC ............................ H04L 1/08; H04W 36/0055; H04W 74/0833; H04W 74/006
See application file for complete search history.

(56) References Cited

U.S. PATENT DOCUMENTS

| | | | |
|---|---|---|---|
| 2008/0189360 A1 | 8/2008 | Kiley | |
| 2009/0215459 A1* | 8/2009 | Kuo | H04W 74/002 455/436 |
| 2014/0098761 A1* | 4/2014 | Lee | H04W 74/006 370/329 |
| 2015/0057011 A1* | 2/2015 | Di Girolamo | H04W 74/0808 455/454 |
| 2016/0088660 A1* | 3/2016 | Liu | H04L 5/00 370/252 |
| 2016/0128029 A1* | 5/2016 | Yang | H04W 56/0015 370/329 |

(Continued)

FOREIGN PATENT DOCUMENTS

CN    103202057 A    7/2013

OTHER PUBLICATIONS

European Search report dated Jan. 26, 2015 for EP application No. 14191255.0.

(Continued)

*Primary Examiner* — Charles C Jiang
*Assistant Examiner* — Ryan Kavleski
(74) *Attorney, Agent, or Firm* — Winston Hsu

(57) ABSTRACT

A method of handling coverage enhancement for a user equipment (UE) of a wireless communication system includes determining whether the UE is in an enhanced coverage mode according to the number of repetitions of a downlink transmission based on which the UE successfully decodes a system information block (SIB); and performing an uplink transmission with repetitions or without repetitions based on whether the UE is in the enhanced coverage mode.

12 Claims, 4 Drawing Sheets

(56) References Cited

U.S. PATENT DOCUMENTS

2016/0192376 A1* 6/2016 Lee ................. H04W 48/20
                                                    370/252
2016/0227580 A1* 8/2016 Xiong ............. H04W 36/0055

OTHER PUBLICATIONS

Alcatel-Lucent, Alcatel-Lucent Shanghai Bell, "Configurable repetition level for PBCH", 3GPP TSG-RAN WG1 Meeting#73, R1-132055, May 20-24, 2013, Fukuoka, Japan, XP050697837, pp. 1-3.

LG Electronics, "Text proposal for coverage enhancement of MTC UEs", 3GPP TSG RAN WG1 Meeting#72bis, R1-131294, Apr. 15-19, 2013, Chicago, USA, XP050697171, pp. 1-6.

Sierra Wireless, "Restrictive Scheduling for SIBs for MTC Coverage improvement", 3GPP TSG RAN WG1 #73, R1-131867, May 20-24, 2013, Fukuoka, Japan, XP050697654, pp. 1-4.

Ericsson, "System information for enhanced coverage MTC UE", 3GPP TSG RAN WG1 Meeting#74bis, R1-134647, Oct. 7-11, 2013, Guangzhou, China, XP050717729, pp. 1-7.

Alcatel-Lucent, Alcatel-Lucent Shanghai Bell, "Coverage enhancement mode operation", 3GPP TSG-RAN WG1 Meeting#74, R1-132977, Aug. 19-23, 2013, Barcelona, Spain, XP050716212, pp. 1-2.

3GPP TR 36.888 V12.0.0 (Jun. 2013), "3rd Generation Partnership Project; Technical Specification Group Radio Access Network; Study on provision of low-cost Machine-Type Communications (MTC) User Equipments (UEs) based on LTE (Release 12)", pp. 1-55.

3GPP TS 36.300 V11.7.0 (Sep. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", pp. 1-209.

3GPP TS 36.331 V11.5.0 (Sep. 2013), "3rd Generation Partnership Project; Technical Specification Group Radio Access Network; Evolved Universal Terrestrial Radio Access (E-UTRA); Radio Resource Control (RRC); Protocol specification (Release 11)", pp. 1-347.

3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", pp. 1-57.

3GPP TS 36.213 V11.4.0 (Sep. 2013), "3rd Generation Partnership Project; Technical Specification Group Radio Access Network; Evolved Universal Terrestrial Radio Access (E-UTRA); Physical layer procedures (Release 11)", pp. 1-182.

Search Report dated Oct. 31, 2016 for EP application No. 16179830.1, pp. 1-8.

LG Electronics, "RACH procedure for coverage enhancement of MTC UEs", 3GPP TSG RAN WG1 #74bis, R1-134393, Oct. 7-11, 2013, Guangzhou, China, XP050717518, pp. 1-3.

NTT DOCOMO, "Discussion on Multi-level PRACH Coverage Enhancement", 3GPP TSG RAN WG1 Meeting #74bis, R1-134493, Oct. 7-11, 2013, Guangzhou, China, XP050717595, pp. 1-5.

NTT DOCOMO, "Discussion on DL Bandwidth Reduction", 3GPP TSG RAN WG1 Meeting #74bis, R1-134492, Oct. 7-11, 2013, Guangzhou, China, XP050717594, pp. 1-4.

Office action dated Jul. 5, 2017 for the China application No. 201410610257.9, filing date Oct. 31, 2014, pp. 1-5.

* cited by examiner

METHOD OF HANDLING COVERAGE ENHANCEMENT IN WIRELESS COMMUNICATION SYSTEM

CROSS REFERENCE TO RELATED APPLICATIONS

This application claims the benefit of U.S. Provisional Application No. 61/898,445, filed on Oct. 31, 2013 and titled "Method and Apparatus for operation in enhanced coverage mode in a wireless communication system", the contents of which are incorporated herein by reference.

BACKGROUND OF THE INVENTION

1. Field of the Invention

The present invention relates to a method utilized in a wireless communication system, and more particularly, to a method of operations in a cell with coverage enhancement in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (CoMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A machine type communication (MTC) device which can automatically perform predefined jobs and report corresponding results to other devices, a server, a Node-B (NB) or an eNB can be used in various areas, such as security, tracking and tracing, payment, healthcare, metering, etc. Further, the MTC device preferably reports the corresponding results via a wireless link such that limitation caused by environment can be removed. However, the wireless link used by the MTC device is needed to be established, and radio resources required by the wireless link is needed to be allocated (i.e., assigned). Reuse of existing infrastructures and wireless communication systems become a viable choice for operations of the MTC device. Therefore, the UMTS, the LTE system and the LTE-A system, etc., developed by the 3GPP which are widely deployed are suitable for the operations of the MTC device. An MTC device is considered to be a type of UE.

Some MTC devices may be installed in the basements of residential buildings or locations shielded by foil-backed insulation, metalized windows or traditional thick-walled building construction, and these devices would experience significant penetration losses on the radio interface than normal LTE devices. The MTC devices in the extreme coverage scenario might have characteristics such as very low data rate, greater delay tolerance and no mobility, and therefore some messages/channels may not be required. In such an extreme coverage scenario, MTC UEs works at an enhanced coverage mode in which signaling, data transmission and radio resources may be of different forms than those for the UEs in the ordinary environment.

More energy can be accumulated to improve coverage by prolonging transmission time. The existing transmission time interval (TTI) bundling and hybrid automatic repeat request (HARQ) retransmission in data channel can be helpful. Note that since the current maximum number of UL HARQ retransmissions is 28 and TTI bundling is up to 4 consecutive subframes, TTI bundling with a larger TTI bundle size may be considered and the maximum number of HARQ retransmissions may be extended to achieve better performances. Other than the TTI bundling and HARQ retransmission, repetition can be applied by repeating the same or different redundancy versions (RV) multiple times. In addition, code spreading in the time domain can also be considered to improve coverage. MTC traffic packets could be radio link control (RLC) transmission segmented into smaller packets; very low rate coding, lower modulation order (e.g., BPSK) and shorter length cyclic redundancy check (CRC) may also be used. New decoding techniques (e.g., correlation or reduced search space decoding) can be used to improve coverage by taking into account the characteristics of the particular channels (e.g., channel periodicity, rate of parameter changes, channel structure, limited content, etc.) and the relaxed performance requirements (e.g., delay tolerance).

Note that, in order to enhance coverage of a cell in downlink (DL), repetitions of DL transmission, e.g., system information and physical DL shared channel (PDSCH), can be used. In order to enhance coverage of a cell in UL, repetitions of UL transmission, e.g., preamble and physical UL shared channel (PUSCH), can be used. However, a UE (e.g., a MTC device) configured to use coverage enhancement operations (e.g., repetitions of transmission) must always use the coverage enhancement operations, and cannot determine whether to use them according to signal integrity, mobility or environmental situations, etc. If the UE is configured to operate with coverage enhancement at all times, more repetitions of transmission consume more power and occupy more resources when the coverage enhancement is not required.

On the other hand, when a UE receives a handover command to be handed over to a cell, the UE performs random access to the cell. However, it is not clear how the UE performs the random access when coverage enhancement is applied. Especially, the UE is not able to determine whether it is in an enhanced coverage mode when the UE performs the random access due to the handover.

SUMMARY OF THE INVENTION

It is therefore an objective of the present invention to provide a method of handling coverage enhancement in a wireless communication system to solve the abovementioned problem.

The present invention discloses a method of handling coverage enhancement for a user equipment (UE) of a wireless communication system. The method comprises determining whether the UE is in an enhanced coverage mode according to the number of repetitions of a downlink transmission based on which the UE successfully decodes a system information block (SIB); and performing an uplink transmission with repetitions or without repetitions based on whether the UE is in the enhanced coverage mode.

The present invention further discloses a method of handling coverage enhancement for a network of a wireless communication system. The method comprises in response to being informed by a UE of the wireless communication system that the UE is not in the enhanced coverage mode, stopping performing repetitions on a transmission to the UE, wherein the UE informs of not being in the enhanced coverage mode by transmitting a random access preamble or a first message to the network.

The present invention further discloses a method of handling coverage enhancement for a network of a wireless communication system. The method comprises transmitting a handover command including a random access configuration to a UE of the wireless communication system, wherein the random access configuration indicates the number of repetitions that the UE follows to transmit a random access preamble.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
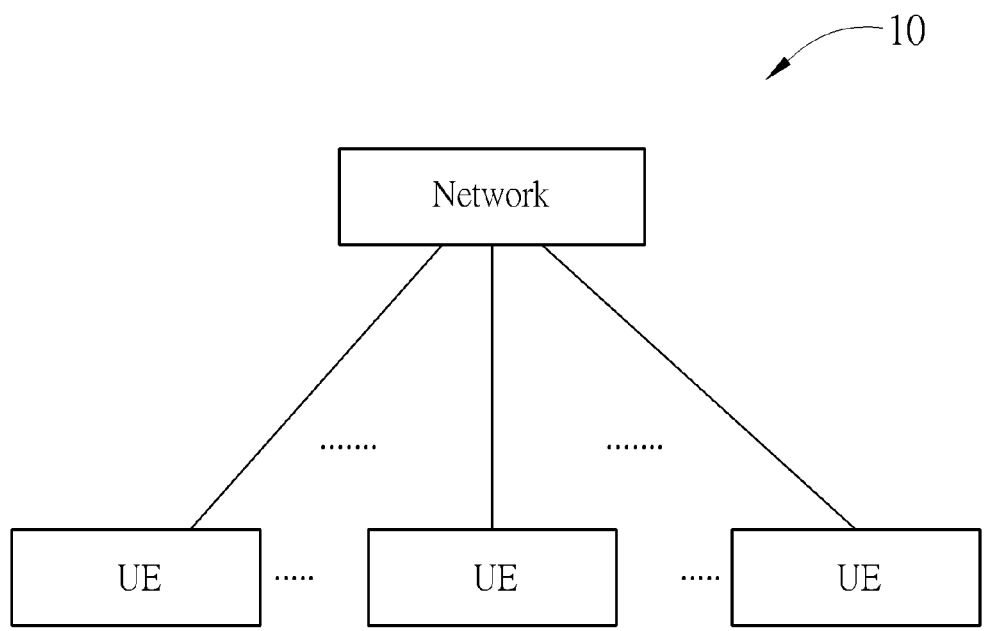
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network. A UE can be a machine type communication (MTC) device, a mobile phone, a laptop, a tablet computer, an electronic book or a portable computer system but is not limited. In addition, the network and the UE can be seen as a transmitter or a receiver according to direction, e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 2:
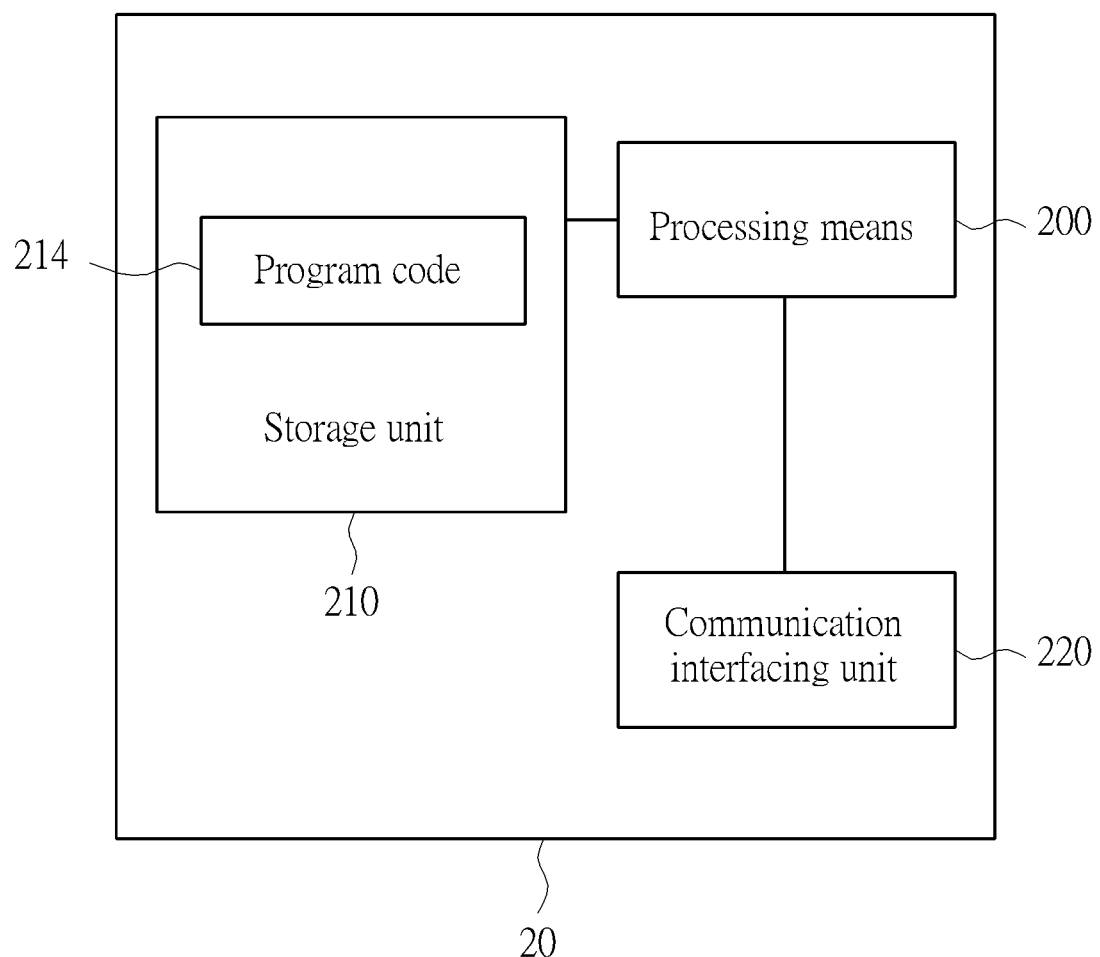
FIG. 2 is a schematic diagram of a communication device according to an embodiment of the present invention.

Please refer to FIG. 2, which is a schematic diagram of a communication device 20 according to an embodiment of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
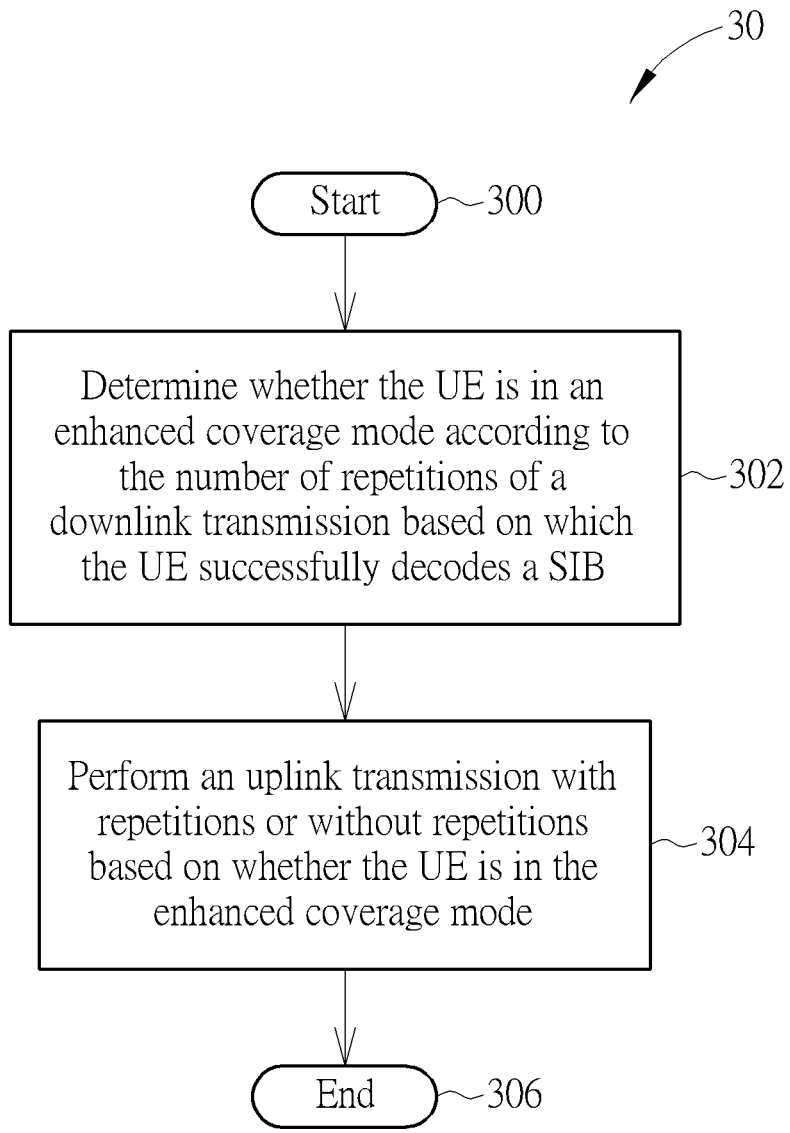
FIG. 3 is a flowchart of a process according to an embodiment of the present invention.

Please refer to FIG. 3, which is a flowchart of a process 30 according to an embodiment of the present invention. The process 30 may be utilized in a UE of the wireless communication system 10 shown in FIG. 1, for handling coverage enhancement. The process 30 may be compiled into the program code 214 and includes the following steps:

Step 300: Start.

Step 302: Determine whether the UE is in an enhanced coverage mode according to the number of repetitions of a downlink transmission based on which the UE successfully decodes a system information block (SIB).

Step 304: Perform an uplink transmission with repetitions or without repetitions based on whether the UE is in the enhanced coverage mode.

Step 306: End.

According to the process 30, the UE may determine whether it is in an enhanced coverage mode according to the number of repetitions of a downlink transmission based on which the UE successfully decodes a SIB. In one example, the SIB in Step 302 may be a master information block (MIB), SIB1, or SIB2, which are system information from the eNB. MIB is transmitted on the physical broadcast channel (PBCH); SIB1 and SIB2 are transmitted on the physical downlink shared channel (PDSCH). In another example, the SIB in step 302 can be any other SIB different from the MIB, SIB1 and SIB2.

In detail, Step 302 includes that the UE determines that it is in the enhanced coverage mode if the UE successfully decodes the SIB based on multiple repetitions of the downlink transmission (which contains the SIB). More specifically, the UE may receive multiple repetitions of PDSCH or PBCH transmissions and combine the received multiple repetitions of the PDSCH or PBCH transmissions to decode the SIB (which is SIB1 or SIB2 on PDSCH, or MIB on PBCH). Step 302 also includes that the UE determines that it is not in the enhanced coverage mode if the UE successfully decodes different SIBs respectively based on once downlink transmission (which contains the SIB).

After the UE determines it is in the enhanced coverage mode or not, in Step 304, the UE performs an uplink transmission with repetitions or without repetitions based on whether the UE is in the enhanced coverage mode; and in other words, the UE transmits the uplink transmission with repetitions if the UE is in the enhanced coverage mode, and the UE transmits the uplink transmission without repetitions if the UE is not in the enhanced coverage mode. In one example, the uplink transmission may be a random access preamble in a random access procedure.

Furthermore, a way of transmitting the multiple repetitions of the SIB is different from a legacy way of the LTE system transmitting the SIB. The number of the multiple repetitions may range from 5 to 80 to achieve different sizes of cell coverage and is larger than the number of repetitions used in the legacy way. The number of repetitions used in the legacy way in the LTE system for transmitting the SIB (e.g., MIB or SIB1) may be 4 and positions of 4 repetitions of the SIB are described in 3GPP Technical Specification 36.331 RRC specification. In other words, the UE may determine that it is not in the enhanced coverage mode if the UE successfully decodes all different SIBs in the legacy way, i.e., receiving less than 5 repetitions. If the UE fails to decode a first SIB in the legacy way, the UE will try to decode the first SIB based on the multiple repetitions, which is more than in the legacy way, of the first SIB and determines it is in the enhanced coverage mode if the UE successfully decodes the SIB accordingly.

When the UE is in the enhanced coverage mode, the UE may perform uplink transmissions with repetitions, in order to increase the possibility of successful reception by a corresponding eNB; and when the UE is not in the enhanced coverage mode, the UE may perform uplink transmissions without repetitions. In such a condition, the UE itself determines whether it is in the enhanced coverage mode instead of following a predetermined configuration of the enhanced coverage mode for a general MTC device. The UE may adaptively determine whether to repeat uplink transmissions or perform coverage enhancement operations after determining it is in the enhanced coverage mode. Therefore, when the UE is not in the enhanced coverage mode or leaves the enhanced coverage mode, repetitions and other coverage enhancement operations may not be performed since they are not required. This decreases unnecessary wastes on power consumption and radio resources.

In an embodiment, all of the MIB, SIB1 and SIB2 are required for a UE to access an eNB of the network. If all of the MIB, SIB1 and SIB2 can be received and decoded by the UE without receiving any repetitions of PBCH or PDSCH transmission including the MIB, SIB1 or SIB2, the UE may determine that it is not in the enhanced coverage mode, and no repeated transmissions or other coverage enhancement operations are required. Otherwise, if any of the MIB, SIB1 and SIB2 is decoded by the UE via repetitions of PBCH or PDSCH transmission including any of the MIB, SIB1 or SIB2, the UE may determine that it is in the enhanced coverage mode. For example, the UE may decode the MIB and SIB1 without repetitions but decode the SIB2 by receiving repetitions of PDSCH transmission including the SIB2.

In such a condition, the UE is still determined to be in the enhanced coverage mode since all of the MIB, SIB1 and SIB2 are required for the communication with the eNB.

In general, the system information may be transmitted periodically and vary with a modification period; hence, the UE may try to decode the SIB every modification period. In such a condition, the UE may determine whether it is in the enhanced coverage mode every modification period; that is, the UE periodically determines whether it is in the enhanced coverage mode or not, i.e., Step 302 is periodically performed.

The UE notifies the eNB whether the UE is in the enhanced coverage mode by performing uplink transmissions with or without repetitions (as in Step 304). In an embodiment, the uplink transmission may be a random access preamble in a random access procedure. The UE may transmit a random access preamble to the eNB for the random access procedure according to whether it is in the enhanced coverage mode. More specifically, the UE may transmit repetitions of the random access preamble when it is in the enhanced coverage mode, or transmit the random access preamble without any repetition when it is not in the enhanced coverage mode. In the enhanced coverage mode, the random access preamble may be repeated in specific radio resources in terms of frequency, time or code spreading. Alternatively, the UE may transmit a shorter random access preamble when it is not in the enhanced coverage mode, and transmit a longer random access preamble when it is in the enhanced coverage mode, wherein the longer random access preamble may include several repetitions of required information repeated in time or frequency. When the repetitions of the random access preamble or the longer random access preamble is received by the eNB, the eNB may know that the UE is in the enhanced coverage mode where repetitions of transmissions are required; hence, the eNB may transmit a random access response (RAR) or repetitions of RAR including a UL grant with a number of repetitions for a physical UL shared channel (PUSCH) transmission. Therefore, the UE may transmit the PUSCH transmission with the number of repetitions indicated by the RAR after receiving the RAR. The number of repetitions may range from 3 to 150. On the other hand, when the eNB receives a normal random access preamble without repetitions from the UE, the eNB may determine that the UE is not in the enhanced coverage mode and perform a normal random access procedure with the UE. That is, the eNB may transmit a general RAR including the UL grant only (without indicating the number of repetitions for the PUSCH transmission).

As shown in the above example, the UE notifies the eNB whether the UE is in the enhanced coverage mode by transmitting the random access preamble during the random access procedure. In another embodiment, the UE may transmit a dedicated message, e.g., a radio resource control (RRC) message or a media access control (MAC) element, to notify the eNB whether the UE is in the enhanced coverage mode. Further note that whether the UE transmits repetitions of the dedicated message to the eNB is based on the mode that the UE is currently in. The UE transmits repetitions of the dedicated message, if the UE is currently in the enhanced coverage mode but intends to change to be not in the enhanced coverage mode; and, the UE transmits the dedicated message once, if the UE is currently not in the enhanced coverage mode but intends to change to be in the enhanced coverage mode. After receiving the dedicated message indicating that the UE is not in the enhanced coverage mode, the eNB may stop performing repetitions on the downlink transmission to the UE. In addition, the eNB may also transmit another message to the UE to indicate that the eNB releases the repetition configuration (e.g., the number of repetitions for UL transmission of the UE) for the UE, in response to receiving the message indicating that the UE is not in the enhanced coverage mode. In other words, when the UE leaves the enhanced coverage mode (e.g., moving out of a basement), the eNB should release the repetition configuration for the UE since repetitions of transmission are not required.

Furthermore, the eNB may enable a mobility management function (e.g. handover or measurement) for the UE in response to receiving a message indicating that the UE is not in the enhanced coverage mode from the UE. For example, a MTC device (e.g., an electricity meter) in the enhanced coverage mode may not need to perform mobility management since the MTC device may be fixed on a specific position. When the MTC device leaves the enhanced coverage mode, e.g., when the MTC device moves out of a place with weak signals (e.g., abasement), the MTC device now requires the mobility management for moving to another cell. Therefore, the eNB should enable the mobility management function for the MTC device when it is notified that the MTC device is not in the enhanced coverage mode. That is, the eNB may ask the MTC device to perform measurement or handover. On the other hand, the eNB may disable the mobility management function for the UE in response to receiving a message indicating that the UE is in the enhanced coverage mode from the UE. For example, the MTC device entering the enhanced coverage mode may be disposed in a specific position and will not be removed for a while, so the eNB may not need to notify the MTC device to perform measurement or handover. In such a condition, it is suggested to disable the mobility management function for the MTC device in order to save radio resources and reduce power consumption. On the other hand, the UE may also actively stop measuring neighboring cells when the UE enters the enhanced coverage mode.

Please note that the embodiments of the present invention can flexibly allow a UE to apply the enhanced coverage mode, where the UE may be a mobile phone, a MTC device or another communication device. This allows the UE to determine whether to use repetitions in UL transmission according to environmental variations (e.g. the UE moving to another place). For example, the UE may enter the enhanced coverage mode and start the repetitions of transmission when entering a basement or elevator. Other environmental variations may include a network change such as deployment of a new eNB or adjustment of configurations in an existing eNB.

Figure 4:
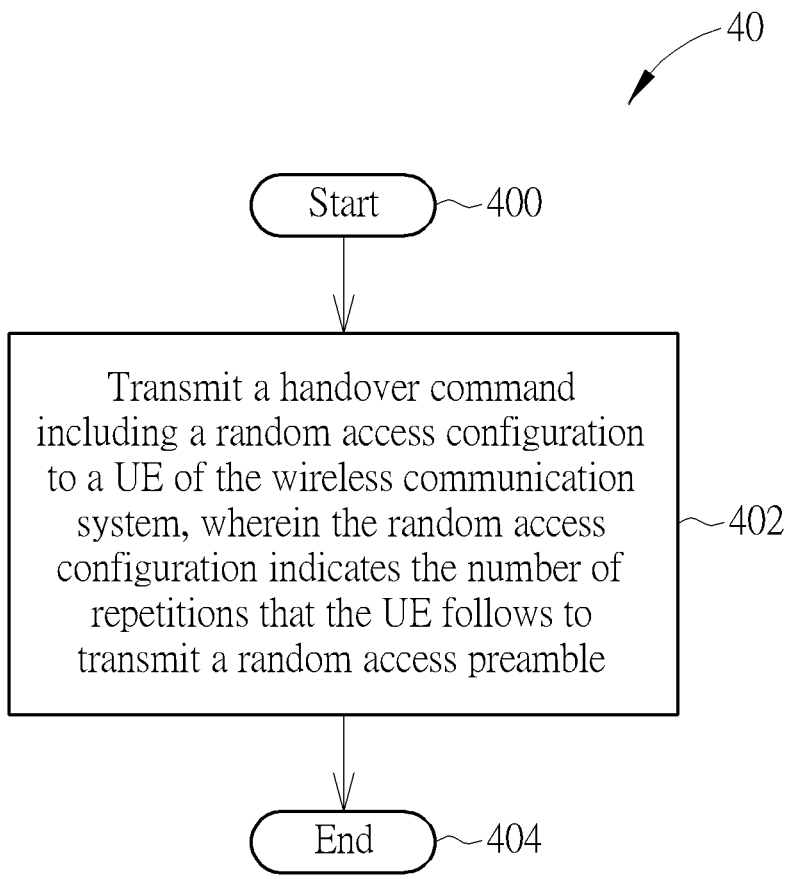
FIG. 4 is a flowchart of a process according to an embodiment of the present invention.

Please refer to FIG. 4, which is a flowchart of a process 40 according to an embodiment of the present invention. The process 40 may be utilized in an eNB of the network of the wireless communication system 10 shown in FIG. 1, for handling coverage enhancement. The process 40 may be compiled into the program code 214 and includes the following steps:

Step 400: Start.

Step 402: Transmit a handover command including a random access configuration to a UE of the wireless communication system, wherein the random access configuration indicates the number of repetitions that the UE follows to transmit a random access preamble.

Step 404: End.

According to the process 40, the eNB may transmit a handover command including a random access configuration to the UE, wherein the random access configuration indicates the number of repetitions that the UE is requested to follow to transmit a random access preamble (i.e., to transmit repetitions of the random access preamble) in the random access procedure. The UE then transmits the random access preamble with the number of repetitions in response to the handover command including the random access configuration.

Different from a general handover command having a random access configuration indicating a random access preamble for the UE only, the random access configuration in the handover command of the present invention not only indicates the random access preamble, but also indicates the number of repetitions of the random access preamble. Accordingly, the UE may transmit the random access preamble with the number of repetitions, and the eNB may expect to receive at most the number of repetitions of the random access preamble; hence, the eNB may operate based on the number of repetitions of the random access preamble transmitted by the UE. Furthermore, the random access configuration may include frequency configuration and/or time configuration such that the UE transmits each of the repetitions in frequency or frequencies, and/or time indicated by the frequency configuration and/or time configuration.

For example, the eNB may transmit a RAR with a number of repetitions in response to the repetitions of the random access preamble. More specifically, the number of repetitions of the RAR may be equal to the number of repetitions of the transmitted random access preamble or the random access preamble which may be successfully received by the eNB, or may be indicated by information carried in the random access preamble. Therefore, the UE may expect to receive the number of repetitions of the RAR during the handover procedure. In such a condition, the eNB may configure a timer T304 to the UE and the UE starts the timer T304 when receiving the handover command. The UE stops the timer T304 when the UE successfully completes the random access procedure triggered by the handover procedure to a target cell. If the timer T304 expires before the UE completes the random access procedure successfully, the UE considers the handover failure. Hence, T304 has a value large enough to cover a period of time, during which the UE is able to transmit possible repetitions of the random access preamble, or even receive possible repetitions of the RAR. The T304 value is then transmitted to the UE via the handover command. In other words, the eNB may configure the T304 value with the handover command transmitted to the UE according to whether the UE is in the enhanced coverage mode. For example, the timer T304 is configured with a maximum value of 8000 milliseconds (ms) if the UE is not in the enhanced coverage mode, wherein the value 8000 ms may be large enough when there are no repetitions in the transmissions of the random access preamble and RAR. However, in consideration of repetitions, the maximum value of 8000 ms may not be large enough for the UE to wait for reception of the last repetition of the RAR. Therefore, the maximum value of the timer T304 should be larger, e.g. 10000 ms, 12000 ms, 14000 ms, 16000 ms or 32000 ms, if the UE is operated in the enhanced coverage mode and repetitions of the random access preamble and/or RAR are required.

In addition, the eNB may determine to include the random access configuration with the number of repetitions of transmission in the handover command when the eNB knows that the UE is in the enhanced coverage mode. The eNB may know whether the UE is in the enhanced coverage mode based on the determination that the eNB itself does, or based on a message or signal sent from the UE. For example, the UE may notify the eNB whether the UE is in the enhanced coverage mode via a previous random access preamble or a dedicated message (e.g., RRC message) as illustrated in the above embodiments; this is not limited herein. In response to the handover command, the UE may further determine whether it is in the enhanced coverage mode after the UE performs the handover according to the handover command. For example, the handover command may include information indicating whether the UE should be in the enhanced coverage mode. In addition, the handover command may also be transmitted with repetitions, so that the UE may determine whether it is in the enhanced coverage mode according to the number of repetitions of the handover command based on which the UE receives and successfully decodes the handover command (e.g., by receiving multiple repetitions of the handover command or without receiving the repetitions of the handover command). In addition, after the UE is handed over to a target eNB, the UE may still need to receive SIB(s) via the target eNB. The UE can thereby determine whether it is in the enhanced coverage mode according to the number of repetitions of downlink transmissions based on which the UE successfully decodes the SIB(s) (e.g., with or without repetitions of the PBCH or PDSCH transmission including the SIB(s)). For example, the UE may receive repetitions of a PBCH including the MIB to decode the MIB and receive repetitions of a PDSCH including the SIB (e.g., SIB1 and SIB2) to decode the SIB after the UE performs the handover according to the handover command, which indicates that the UE is in the enhanced coverage mode.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling coverage enhancement for a wireless communication system. The method allows the UE to determine whether to repeat transmissions or perform coverage enhancement operations according to environmental situations, which saves resources and reduces power consumption when the coverage enhancement is not required. The method further makes the handover operation feasible if repetitions of signal transmissions may be applied in the handover procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling coverage enhancement for a network of a wireless communication system, the method comprising:

the network determining to include a random access configuration in a handover command when the network knows a user equipment (UE) is in an enhanced coverage mode, wherein the random access configuration indicates the number of repetitions that the UE follows to transmit a random access preamble;

the network transmitting the handover command including the random access configuration to the UE of the wireless communication system;

the network receiving repetitions of the random access preamble from the UE; and the network transmitting a random access response with a number of repetitions in response to the repetitions of the random access preamble.

2. The method of claim 1, wherein the UE knows the UE is in the enhanced coverage mode when the UE performs a handover according to the handover command.

3. The method of claim 1, wherein the UE receives repetitions of a physical broadcast channel transmission comprising a master information block (MIB) to decode the MIB and repetitions of a physical downlink shared channel transmission comprising a system information block (SIB) to decode the SIB after the UE performs a handover according to the handover command.

4. The method of claim 1, wherein the handover command comprises a T304 value which is large enough to cover a period of time during which the UE is able to transmit possible repetitions of the random access preamble.

5. A network apparatus of a wireless communication system for handling coverage enhancement, comprising:

a storage device, for storing instructions of:

determining to include a random access configuration in a handover command when the network knows a user equipment (UE) is in an enhanced coverage mode, wherein the random access configuration indicates the number of repetitions that the UE follows to transmit a random access preamble;

transmitting the handover command including the random access configuration to the UE of the wireless communication system;

receiving repetitions of the random access preamble from the UE; and transmitting a random access response with a number of repetitions in response to the repetitions of the random access preamble; and a processing circuit, coupled to the storage device, configured to execute the instructions stored in the storage device.

6. The network apparatus of claim 5, wherein the UE knows the UE is in the enhanced coverage mode when the UE performs a handover according to the handover command.

7. The network apparatus of claim 5, wherein the UE receives repetitions of a physical broadcast channel transmission comprising a master information block (MIB) to decode the MIB and repetitions of a physical downlink shared channel transmission comprising a system information block (SIB) to decode the SIB after the UE performs a handover according to the handover command.

8. The network apparatus of claim 5, wherein the handover command comprises a T304 value which is large enough to cover a period of time during which the UE is able to transmit possible repetitions of the random access preamble.

9. A communication device of a wireless communication system for handling coverage enhancement, comprising:

a storage device, for storing instructions of:

receiving a handover command including a random access configuration from a base station of the wireless communication system, wherein the random access configuration indicates the number of repetitions that the communication device follows to transmit a random access preamble, and the base station includes the random access configuration when the base station knows the communication device is in an enhanced coverage mode;

transmits the random access preamble with the number of repetitions to a target cell, in response to the handover command; and receiving a random access response with a number of repetitions in response to the random access preamble from the target cell; and a processing circuit, coupled to the storage device, configured to execute the instructions stored in the storage device.

10. The communication device of claim 9, wherein the communication device knows the communication device is in the enhanced coverage mode when the communication device performs a handover according to the handover command.

11. The communication device apparatus of claim 9, wherein the communication device receives repetitions of a physical broadcast channel transmission comprising a master information block (MIB) to decode the MIB and repetitions of a physical downlink shared channel transmission comprising a system information block (SIB) to decode the SIB after the communication device performs a handover according to the handover command.

12. The communication device of claim 9, wherein the handover command comprises a T304 value which is large enough to cover a period of time during which the communication device is able to transmit possible repetitions of the random access preamble.

* * * * *